United States Patent
Cho

(10) Patent No.: US 9,764,698 B2
(45) Date of Patent: Sep. 19, 2017

(54) CAMERA POSITION RECOGNITION SYSTEM

(71) Applicant: Hyundai Mobis Co., Ltd., Seoul (KR)

(72) Inventor: Heung Rae Cho, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 443 days.

(21) Appl. No.: 14/304,148

(22) Filed: Jun. 13, 2014

(65) Prior Publication Data
US 2015/0103171 A1    Apr. 16, 2015

(30) Foreign Application Priority Data
Oct. 14, 2013   (KR) .................. 10-2013-0121671

(51) Int. Cl.
*B60R 11/04*    (2006.01)
*B60R 16/00*    (2006.01)

(52) U.S. Cl.
CPC .................... *B60R 16/00* (2013.01)

(58) Field of Classification Search
None
See application file for complete search history.

(56) References Cited

U.S. PATENT DOCUMENTS

| | | | | |
|---|---|---|---|---|
| 2003/0041329 A1* | 2/2003 | Bassett | ............. | H04N 7/185 725/105 |
| 2005/0093975 A1* | 5/2005 | Hamdan | ............. | B60R 1/00 348/118 |
| 2005/0111120 A1* | 5/2005 | Plaster | ............. | B60R 1/00 359/850 |
| 2005/0270152 A1* | 12/2005 | Harumoto | ............. | G08B 25/016 340/539.16 |
| 2009/0224876 A1* | 9/2009 | McCall | ............. | B60R 25/2009 340/5.61 |
| 2010/0278079 A1* | 11/2010 | Meyer | ............. | G01S 5/0252 370/255 |
| 2011/0306323 A1* | 12/2011 | Do | ............. | G01C 21/20 455/414.1 |
| 2012/0002063 A1* | 1/2012 | Lee | ............. | H04N 5/23219 348/211.2 |
| 2012/0077514 A1* | 3/2012 | Perkins | ............. | G01S 5/0257 455/456.1 |
| 2012/0286999 A1* | 11/2012 | Haimerl | ............. | G01S 5/0252 342/464 |
| 2013/0066507 A1* | 3/2013 | Yamane | ............. | B60R 16/0232 701/22 |
| 2013/0081137 A1* | 3/2013 | Geigel | ............. | G06F 11/3006 726/23 |
| 2014/0277935 A1* | 9/2014 | Daman | ............. | G08G 1/127 701/36 |

* cited by examiner

*Primary Examiner* — Kate Luo
(74) *Attorney, Agent, or Firm* — NSIP Law

(57) ABSTRACT

Disclosed is a camera position recognition system including a smart key module which transmits/receives a wireless signal to recognize a smart key; one or more camera modules which receive the wireless signal of the smart key module to obtain an image around a vehicle; an around view module which controls the camera module; and a camera position recognition module which recognizes a position of the camera module based on a strength of the wireless signal which is received by each of the camera modules.

15 Claims, 5 Drawing Sheets

CAMERA POSITION RECOGNITION SYSTEM

CROSS-REFERENCE TO RELATED APPLICATION

This application claims priority to and the benefit of Korean Patent Application No. 10-2013-0121671 filed in the Korean Intellectual Property Office on Oct. 14, 2013, the entire contents of which are incorporated herein by reference.

TECHNICAL FIELD

The present invention relates to a camera position recognition system, and more particularly, to a camera position recognition system which recognizes a position of a camera using a smart key system for a vehicle.

BACKGROUND OF THE INVENTION

According to a recent trend, a newly marketed vehicle includes an around view monitoring system which includes one or more cameras which obtain an image around a vehicle. As described above, when a plurality of cameras is mounted in the vehicle, an Ethernet camera which is comparatively easily provided and managed is used and a plurality of Ethernet cameras may be connected to an ECU of the vehicle through an Ethernet switch. The AVM system which uses the Ethernet cameras needs to determine a unique ID and a position of each camera by sequentially turning off a power switch of the camera in order to determine a position where the camera is mounted. However, in this case, when power is turned off, the image transmission is stopped due to a characteristic of an image sensor which is provided in the camera and an initializing time to stabilize the turned-off power is required.

SUMMARY OF THE INVENTION

The present invention has been made in an effort to provide a camera position recognition system which determines positional information of a plurality of cameras which is mounted in a vehicle using a smart key system for a vehicle.

The present invention provides a camera position recognition system including: a smart key module which transmits/receives a wireless signal to recognize a smart key; one or more camera modules which receive the wireless signal of the smart key module to obtain an image around a vehicle; an around view module which controls the camera module; and a camera position recognition module which recognizes a position of the camera module based on a strength of the wireless signal which is received by each of the camera modules.

In a first exemplary embodiment of the present invention, the camera module may include: an RSSI measurement module which measures the strength of the wireless signal to generate an RSSI measurement value; and a wireless transceiver which receives the wireless signal and wirelessly transmits the RSSI measurement value.

The smart key module may include: a wireless transceiver which transmits the wireless signal and receives the RSSI measurement value from the camera module; and a position determination module which determines positions of the camera modules based on the RSSI measurement values transmitted from the camera modules.

The position determination module of the smart key module may transmit the position information of the camera modules to the around view module.

The position determination module of the smart key module may determine the position of the smart key and may be compatible to determine the position information of the camera modules.

In a second exemplary embodiment of the present invention, the camera module may include: an RSSI measurement module which measures the strength of the wireless signal to generate an RSSI measurement value; and a wireless receiver which receives the wireless signal and transmit the RSSI measurement value to the around view module in a wired manner through a vehicle wire network.

The smart key module may include: a wireless transceiver which transmits the wireless signal to determine positions of the smart key and the camera modules.

The around view module may include a position determination module which determines positions of the camera modules based on the RSSI measurement values transmitted from the camera modules.

In a third exemplary embodiment of the present invention, the around view module may transmit the RSSI measurement values which are transmitted from the camera modules to the smart key module.

The smart key module may include: a wireless transceiver which transmits the wireless signal to determine positions of the smart key and the camera modules; and a position determination module which determines the positions of the camera modules based on the RSSI measurement values which are transmitted from the around view module, and transmit the position information of the camera modules to the around view module.

In a fourth exemplary embodiment of the present invention, the camera module may include: an RSSI measurement module which measures a strength of the wireless signal to generate an RSSI measurement value; a wireless receiver which receives the wireless signal; and a position determination module which determines a position of the camera module based on the RSSI measurement value, and transmit the position information of the camera modules which is generated based on the RSSI measurement value to the around view module in a wired manner through a vehicle wire network.

According to the camera position recognition system of the present invention, positional information of a plurality of cameras may be precisely recognized using a wireless transmission signal of a smart key system which is provided in a vehicle.

DETAILED DESCRIPTION OF THE EMBODIMENTS

Hereinafter, a camera position recognition system according to exemplary embodiments of the present invention will be described in detail with reference to accompanying drawings.

Figure 1:
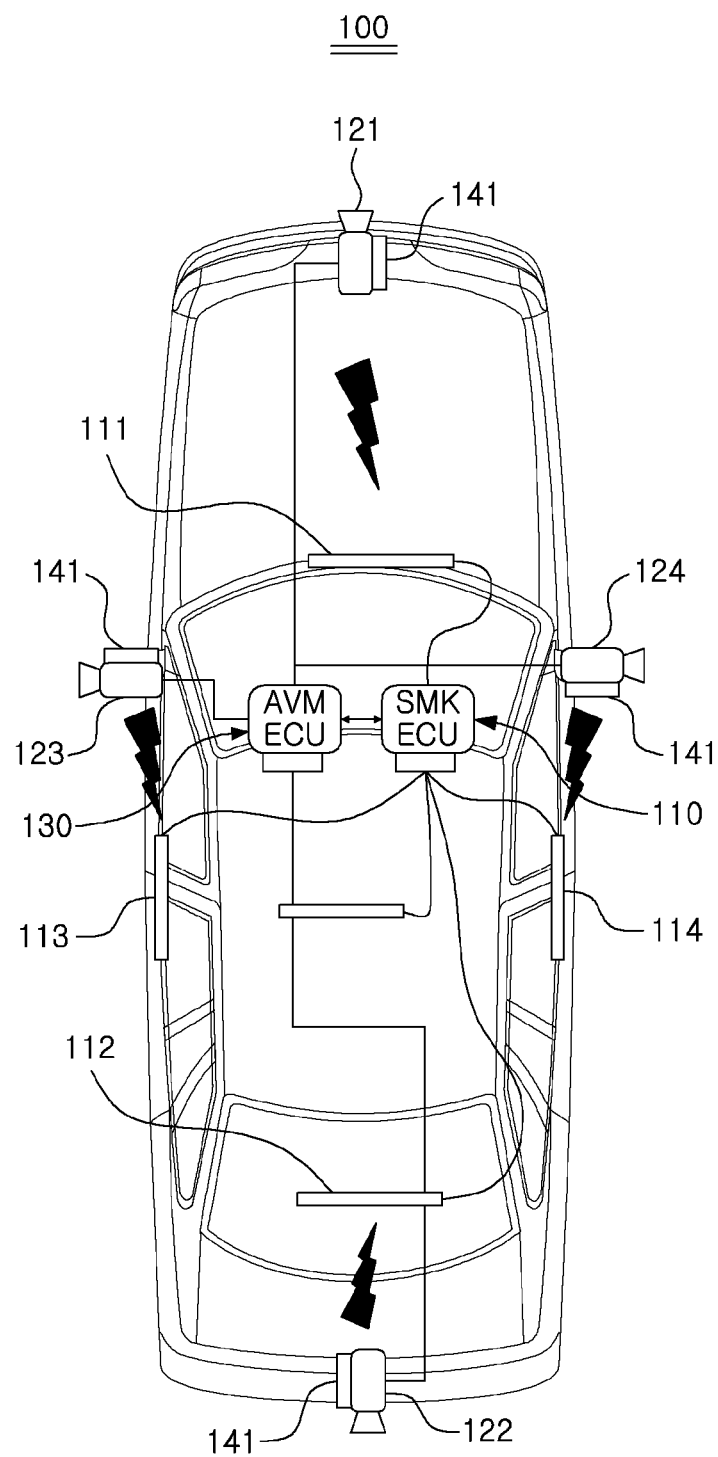
FIG. 1 is a schematic view of a camera position recognition system according to an exemplary embodiment of the present invention.
Figure 2:
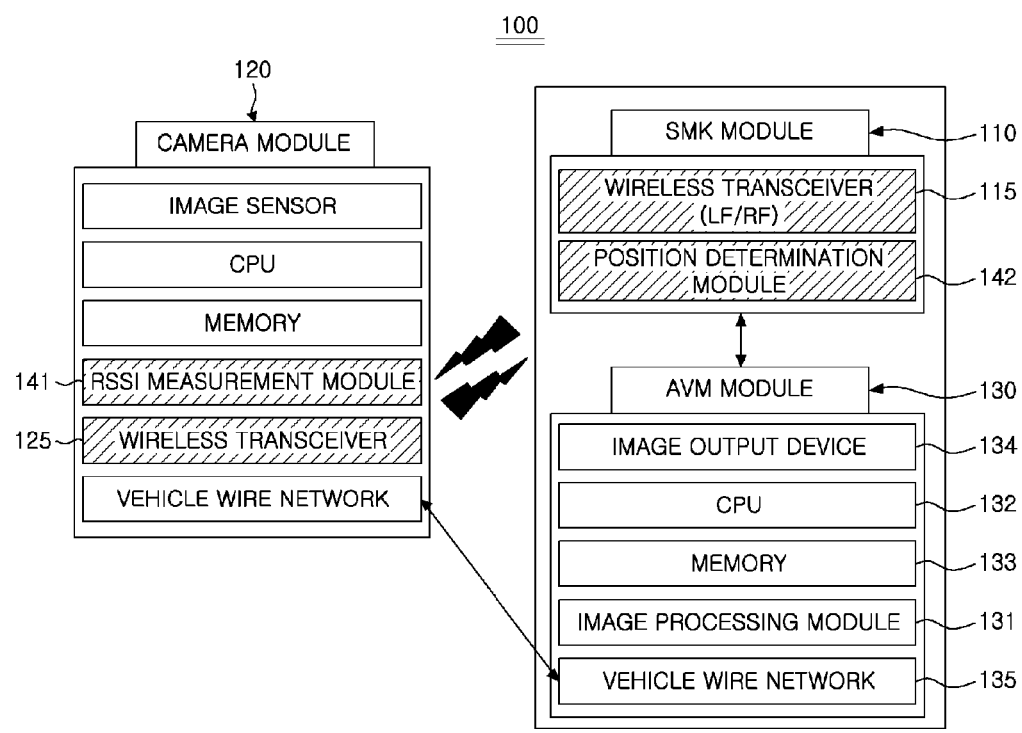
FIG. 2 is a schematic view of a camera position recognition system according to a first exemplary embodiment of the present invention.

As illustrated in FIGS. 1 and 2, a camera position recognition system 100 according to an exemplary embodiment of the present invention includes a smart key module 110 which transmits/receives a wireless signal to/from one or more antennas 111, 112, 113, and 114 in order to recognize a vehicle smart key, an around view module 130 which controls one or more camera modules 121, 122, 123, and 124 which are provided to obtain images around the vehicle, and a camera position recognition module 140 which recognizes positions of the cameras.

The smart key module 110 transmits a wireless signal to the outside of a vehicle to recognize a smart key which is carried by a driver and includes a wireless transceiver 115 which transmits/receives a wireless signal to/from four antennas 111, 112, 113, and 114 which are provided in the front, back, left, and right of the vehicle.

The around view module 130 obtains an image around the vehicle and controls the camera modules 121, 122, 123, and 124 which are provided in the front, back, left, and right of the vehicle. The around view module 130 includes an image processing module 131 which processes images which are collected through the camera modules 121, 122, 123, and 124, a CPU 132, a memory 133, an image output device 134 which outputs an image, and a vehicle wire network 135 which performs wire communication with the camera module 120, such as CAN or Ethernet.

The camera recognition module 140 may include a received signal strength indication (RSSI) measurement module 141 which receives a wireless signal which is transmitted through the antennas 111, 112, 113, and 114 and measures a strength of the signal and a position determination module 142 which recognizes a position of the camera based on the signal strength which is measured by the RSSI measurement module 141.

As illustrated in FIG. 1, the RSSI measurement module 141 may be installed in each of the camera modules 121, 122, 123, and 124 and installation positions of the RSSI measurement modules 141 of a front camera module 121 and a rear camera module 122 may be different from each other and installation positions of the RSSI measurement modules 141 of a left camera module 123 and a right camera module 124 may be different from each other.

Hereinafter, camera position recognition systems 100, 200, 300, and 400 according to exemplary embodiments of the present invention will be described in detail with reference to accompanying drawings.

As illustrated in FIG. 2, in a camera position recognition system 100 according to a first exemplary embodiment of the present invention, an RSSI measurement module 141 may be installed in a camera module 120 and a position determination module 142 may be provided in an SMK module 110.

The camera module 120 according to the first exemplary embodiment may include an image sensor which receives an external image, a CPU, a memory, and a vehicle wire network which transmits wire data to an AVM module 130 and also include a wireless transceiver 125 which receives the wire signal transmitted from an SMK module 110 and transmits an RSSI measurement value to the SMK module 110 and an RSSI measurement module 141 which measures a strength of the wireless signal which is received through the wireless transceiver 125.

The SMK module 110 according to the first exemplary embodiment may include a wireless transceiver 115 which transmits/receives the wireless signal to/from a smart key and the camera module 120 and a position determination module 142 which determines a position of the camera module 120 based on the RSSI measurement value.

In the camera position recognition system 100 according to the first exemplary embodiment, the wireless signal which is transmitted from the SMK module 110 to recognize the smart key may be received by the wireless transceivers 125 of the four camera modules 121, 122, 123, and 124 which are installed in the front, back, left, and right of the vehicle. In this case, the strengths of the wireless signals which are received by the wireless transceivers 125 may be measured to be different from each other due to a difference between installation positions of the four camera modules 121, 122, 123, and 124 and installation positions of the RSSI measurement modules 141 and the RSSI measurement value measured as described above may be wirelessly transmitted to the SMK module 110 through the wireless transceiver 125.

The position determination module 142 which is provided in the SMK module 110 may recognize positions of camera modules 121, 122, 123, and 124 based on the RSSI measurement value which is transmitted from the camera module 120 and the position information of the camera modules 121, 122, 123, and 124 is transmitted to the AVM module 130 to be used to initialize and control the positions of the camera modules 121, 122, 123, and 124.

Figure 3:
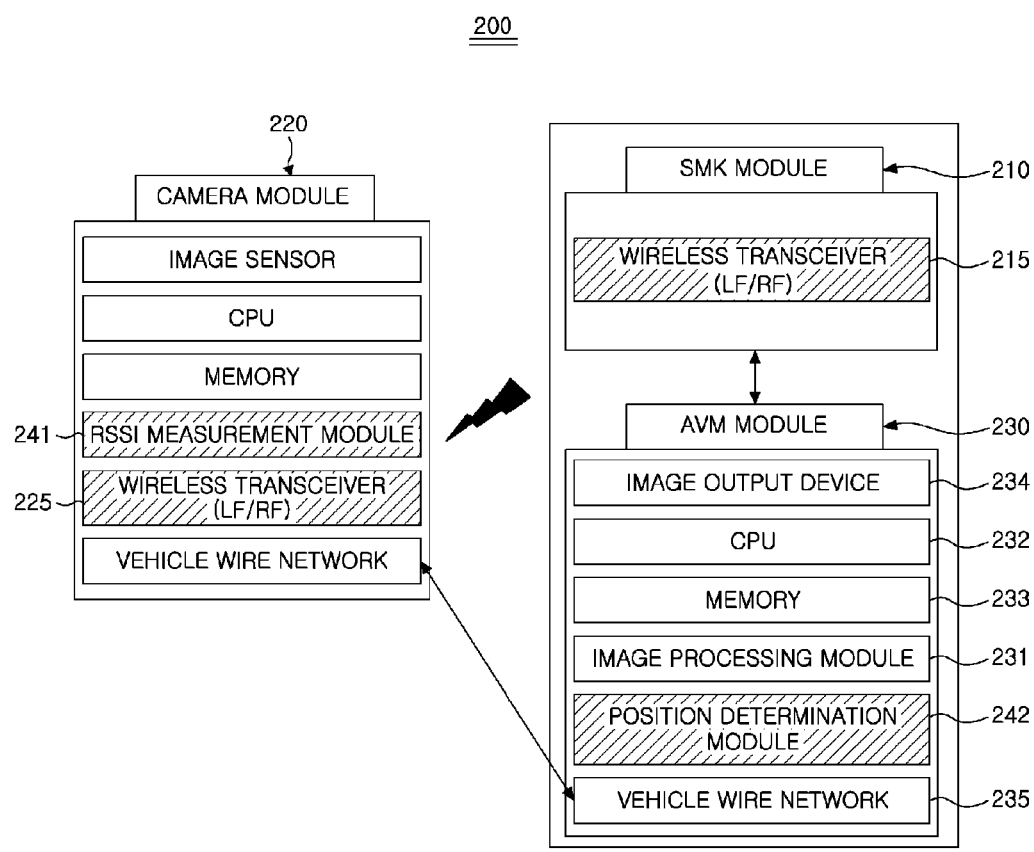
FIG. 3 is a schematic view of a camera position recognition system according to a second exemplary embodiment of the present invention.

As illustrated in FIG. 3, in a camera position recognition system 200 according to a second exemplary embodiment of the present invention, an RSSI measurement module 241 may be installed in a camera module 220 and a position determination module 242 may be provided in an AVM module 230.

The camera module 220 according to the second exemplary embodiment may include an image sensor which receives an external image, a CPU, a memory, an AVM module 230, and a vehicle wire network which transmits wire data and also include a wireless receiver 225 which receives the wire signal transmitted from an SMK module 210, and an RSSI measurement module 241 which measures a strength of the wireless signal which is received through the wireless receiver 225.

The AVM module 230 according to the second exemplary embodiment may include an image processing module 231 which controls the camera module 220 and processes an image collected from the camera module 220, a CPU 232, a memory 233, an image output device 234, a vehicle wire network 235, and a position determination module 242 which determines a position of the camera module 220 based on an RSSI measurement value.

In the camera position recognition system 200 according to the second exemplary embodiment, the wireless signal which is transmitted from the SMK module 210 to recognize the smart key may be received by the wireless receivers 225 of the four camera modules 221, 222, 223, and 224 which are installed in the front, back, left, and right of the vehicle. In this case, strengths of the wireless signals which may be received by the wireless receivers 225 may be measured to be different from each other due to a difference between installation positions of the four camera modules 221, 222, 223, and 224 and installation positions of the RSSI measurement modules 241 and the RSSI measurement value may be transmitted to the AVM module 230 through the vehicle wire network in a wired manner.

The position determination module 242 which is provided in the AVM module 230 may recognize positions of the camera modules 221, 222, 223, and 224 based on the RSSI measurement value which is transmitted from the camera module 220.

Figure 4:
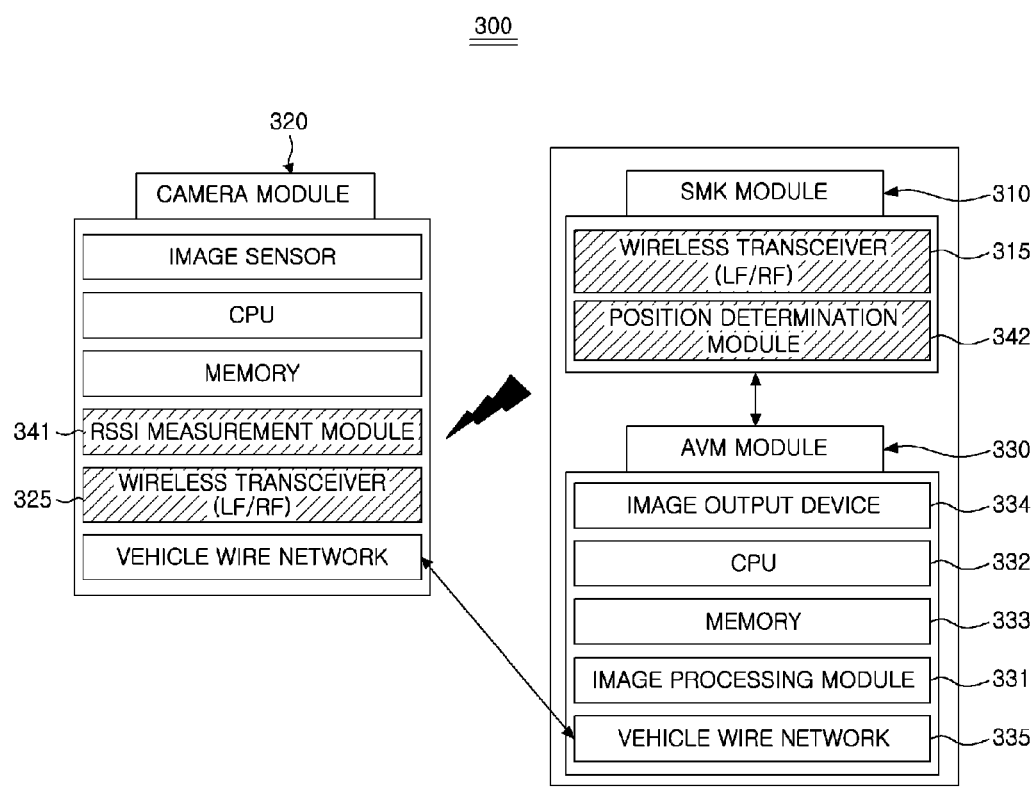
FIG. 4 is a schematic view of a camera position recognition system according to a third exemplary embodiment of the present invention.

As illustrated in FIG. 4, in a camera position recognition system 300 according to a third exemplary embodiment of the present invention, an RSSI measurement module 341 may be installed in a camera module 320 and a position determination module 342 may be provided in an SMK module 310.

The camera module 320 according to the third exemplary embodiment may include an image sensor which receives an external image, a CPU, a memory, an AVM module 330, and a vehicle wire network which transmits wire data and also include a wireless receiver 325 which receives the wire signal transmitted from an SMK module 310, and an RSSI measurement module 341 which measures a strength of the wireless signal which is received through the wireless receiver 325.

The SMK module 310 according to the third exemplary embodiment may include a wireless transceiver 315 which transmits/receives a wireless signal to/from a smart key and the camera module 320 and a position determination module 342 which determines the position of the camera module 320 based on an RSSI measurement value.

In the camera position recognition system 300 according to the third exemplary embodiment, the wireless signal which is transmitted from the SMK module 310 to recognize the smart key may be received by the wireless receivers 325 of the four camera modules 321, 322, 323, and 324 which are installed in the front, back, left, and right of the vehicle. In this case, strengths of the wireless signals which may be received by the wireless receivers 325 may be measured to be different from each other due to a difference between installation positions of the four camera modules 321, 322, 323, and 324 and installation positions of the RSSI measurement module 341 and the RSSI measurement value measured as described above may be transmitted to the AVM module 330 through the vehicle wire network in a wired manner.

The AVM module 330 may transmit the RSSI measurement value to the position determination module 342 which is provided in the SMK module 310 based on the RSSI measurement value transmitted from the camera module 320 to recognize the positions of the camera modules 321, 322, 323, and 324 and the SMK module 310 may transmit position information of the camera modules 321, 322, 323, and 324 which is determined through the position determination module 342 to the AVM module 330.

Figure 5:
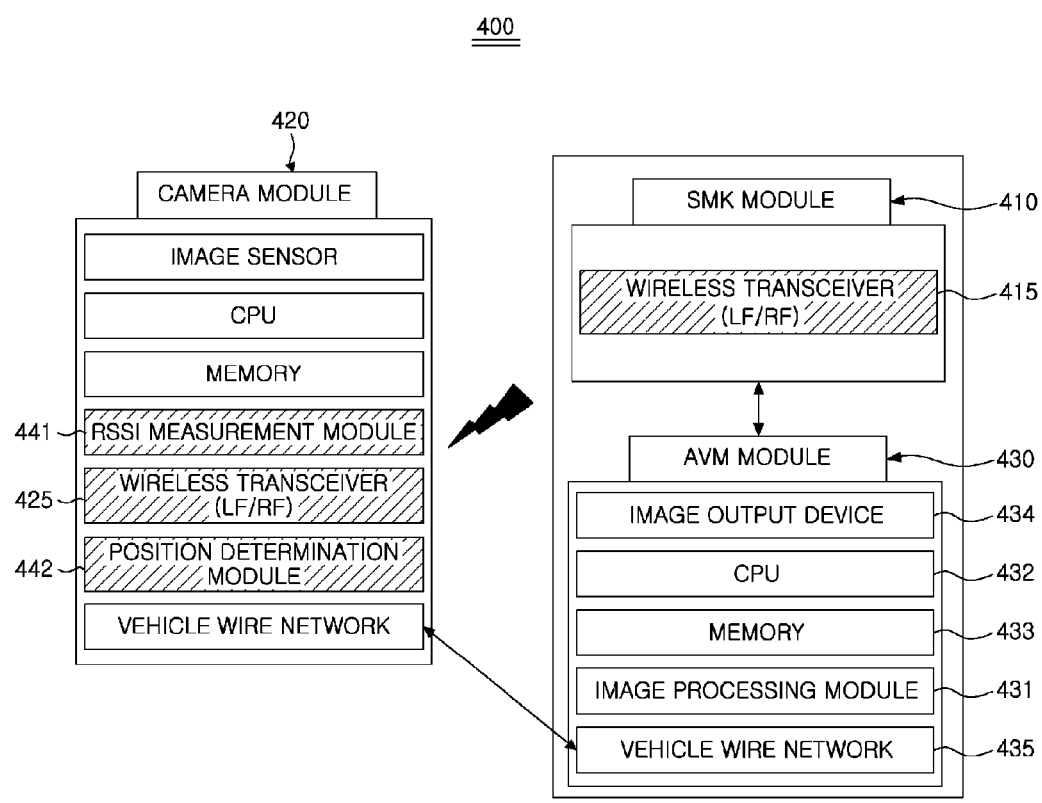
FIG. 5 is a schematic view of a camera position recognition system according to a fourth exemplary embodiment of the present invention.

As illustrated in FIG. 5, in a camera position recognition system 400 according to a fourth exemplary embodiment of the present invention, both an RSSI measurement module 441 and a position determination module 442 may be installed in a camera module 420.

The camera module 420 according to the fourth exemplary embodiment may include an image sensor which receives an external image, a CPU, a memory, an AVM module 430, and a vehicle wire network which transmits wire data and also include a wireless receiver 425 which receives the wire signal transmitted from an SMK module 410, an RSSI measurement module 441 which measures a strength of the wireless signal which is received through the wireless receiver 425, and a position determination module 442 which determines the position of the camera module 420 based on the RSSI measurement value measured from the RSSI measurement module 441.

In the camera position recognition system 400 according to the fourth exemplary embodiment, the wireless signal which is transmitted from the SMK module 410 to recognize the smart key may be received by the wireless receivers 425 of the four camera modules 421, 422, 423, and 424 which are installed in the front, back, left, and right of the vehicle. In this case, strengths of the wireless signals which may be received by the wireless receivers 425 may be measured to be different from each other due to a difference between installation positions of the four camera modules 421, 422, 423, and 424 and installation positions of the RSSI measurement modules 441 and the RSSI measurement value measured as described above may be transmitted to the position determination module 442 which is provided in the camera module 420.

The position determination module 442 may recognize the position of the camera module 420 based on the RSSI measurement value and the recognized position information of the camera module 420 may be transmitted to the AVM module 430 through the vehicle wire network.

While the camera position recognition system according to the present invention has been described with reference to the exemplary embodiments of the present invention, the scope of the present invention is not limited to the exemplary embodiments and it should be understood by those skilled in the art that changes, modifications, and various modified embodiments may be made without departing from the spirit of the present invention.

What is claimed is:

1. A camera position recognition system, comprising:
   a smart key module configured to:
      transmit a wireless signal to a smart key,
      receive a response signal from the smart key, wherein the smart key transmits the response signal in response to receiving the wireless signal, and
      recognize the smart key based on the received response signal;
   a camera module configured to:
      receive the wireless signal,
      obtain an image around a vehicle,
      generate a received signal strength indication (RSSI) value based on the strength of the received wireless signal, and
      transmit the RSSI value to the smart key module;
   an around view module configured to control the camera module; and
   a camera position recognition module installed in the smart key module or the around view module, and configured to recognize a position of the camera module based on the RSSI value received by the smart key module.

2. The camera position recognition system of claim 1, wherein the camera module comprises:
   a received signal strength indication (RSSI) measurement module configured to measure the strength of the wireless signal, and to generate the RSSI value; and
   a wireless transceiver configured to receive the wireless signal, and to wirelessly transmit the RSSI measurement value.

3. The camera position recognition system of claim 2, wherein the smart key module comprises:
   a wireless transceiver configured to:

transmit the wireless signal, and
receive the RSSI measurement value from the camera module; and
a position determination module configured to determine the position of the camera module based on the RSSI value transmitted from the camera module.

4. The camera position recognition system of claim 3, wherein the position determination module of the smart key module is configured to transmit the position information of the camera module to the around view module.

5. The camera position recognition system of claim 4, wherein the position determination module of the smart key module is configured to:
determine the position of the smart key, and
determine the position information of the camera module.

6. The camera position recognition system of claim 5, further comprising:
a front camera module and a rear camera module, which are respectively installed in a front position and a rear position of the vehicle; and
a left camera module and a right camera module, which are respectively installed in a left position and a right position of the vehicle.

7. The camera position recognition system of claim 6, wherein:
an installation position of an RSSI measurement module of the front camera module and an installation position of an RSSI measurement module of the rear camera module are different from each other, and
an installation position of an RSSI measurement module of the left camera module and an installation position of an RSSI measurement module of the right camera module are different from each other.

8. The camera position recognition system of claim 1, wherein the camera module comprises:
an RSSI measurement module configured to measure the strength of the wireless signal, and to generate the RSSI value; and
a wireless receiver configured to receive the wireless signal, and to transmit the RSSI value to the around view module, in a wired manner through a vehicle wire network.

9. The camera position recognition system of claim 8, wherein the smart key module comprises:
a wireless transceiver configured to transmit the wireless signal to determine a position of the smart key and the position of the camera module.

10. The camera position recognition system of claim 9, wherein the around view module comprises:
the position determination module, wherein the position determination module is configured to determine the position of the camera module based on the RSSI value transmitted from the camera module.

11. The camera position recognition system of claim 10, wherein the around view module is configured to transmit the RSSI value, which is transmitted from the camera module, to the smart key module.

12. The camera position recognition system of claim 11, wherein the smart key module comprises:
a wireless transceiver configured to transmit the wireless signal to determine a position of the smart key and the position of the camera module.

13. The camera position recognition system of claim 12, further comprising:
a front camera module and a rear camera module, which are respectively installed in a front position and a rear position of the vehicle; and
a left camera module and a right camera module, which are respectively installed in a left position and a right position of the vehicle,
wherein an installation position of an RSSI measurement module of the front camera module and an installation position of an RSSI measurement module of the rear camera module are different from each other, and
wherein an installation position of an RSSI measurement module of the left camera module and an installation position of an RSSI measurement module of the right camera module are different from each other.

14. The camera position recognition system of claim 1, wherein the camera module comprises:
an RSSI measurement module configured to measure the strength of the received wireless signal to generate the RSSI value;
a wireless receiver configured to receive the wireless signal; and
an additional position determination module configured to:
determine a position of the camera module based on the RSSI value, and
transmit the position information of the camera module to the around view module in a wired manner through a vehicle wire network.

15. The camera position recognition system of claim 14, further comprising:
a front camera module and a rear camera module, which are respectively installed in a front position and a rear position of the vehicle; and
a left camera module and a right camera module, which are respectively installed in a left position and a right position of the vehicle,
wherein an installation position of an RSSI measurement module of the front camera module and an installation position of an RSSI measurement module of the rear camera module are different from each other, and
wherein an installation position of an RSSI measurement module of the left camera module and an installation position of an RSSI measurement module of the right camera module are different from each other.

* * * * *